Dec. 2, 1941.    M. H. GROVE    2,264,306
FLUID FLOW CONTROLLER
Filed Oct. 10, 1938    3 Sheets-Sheet 2
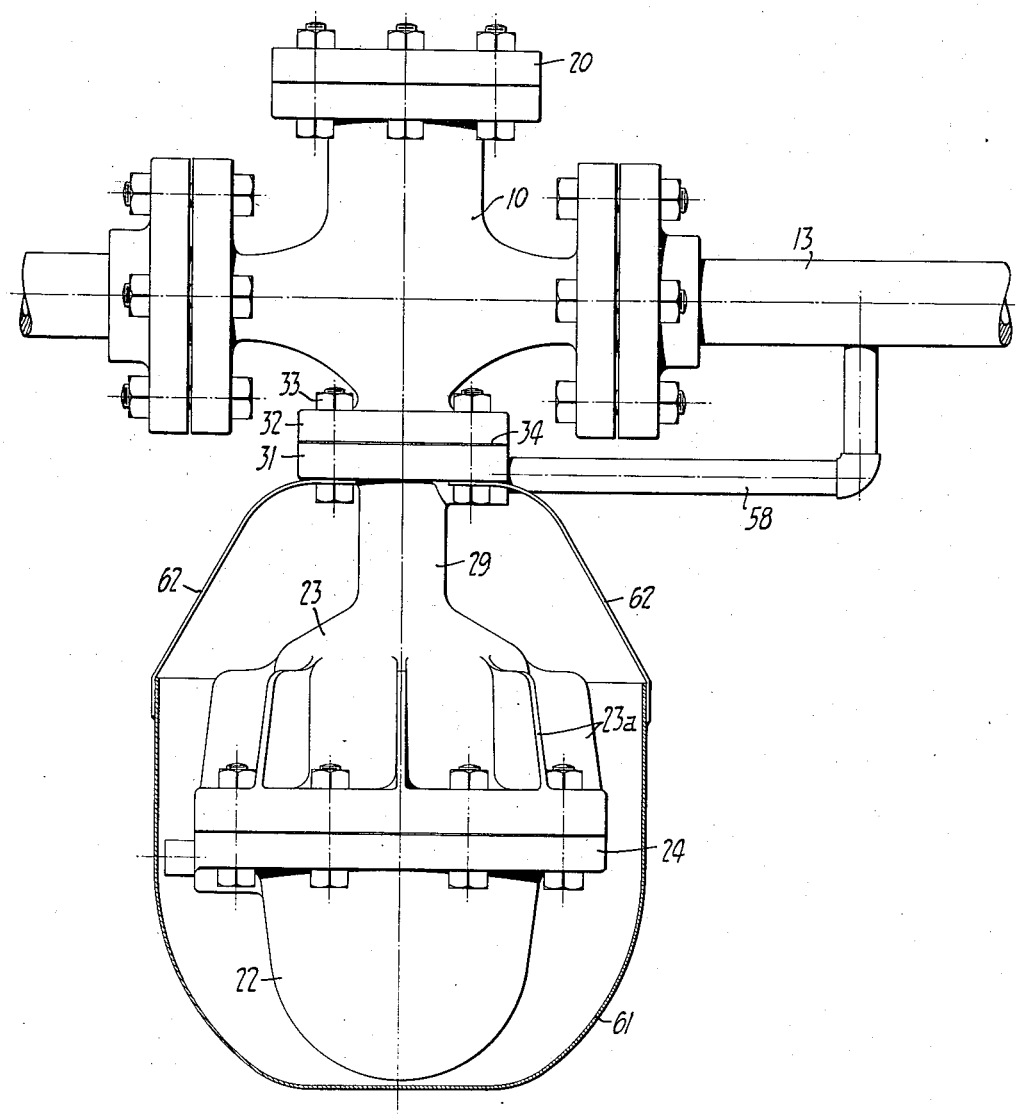
FIG_2_
INVENTOR.
Marvin H. Grove
BY
ATTORNEY Dec. 2, 1941.    M. H. GROVE    2,264,306
FLUID FLOW CONTROLLER
Filed Oct. 10, 1938    3 Sheets-Sheet 3
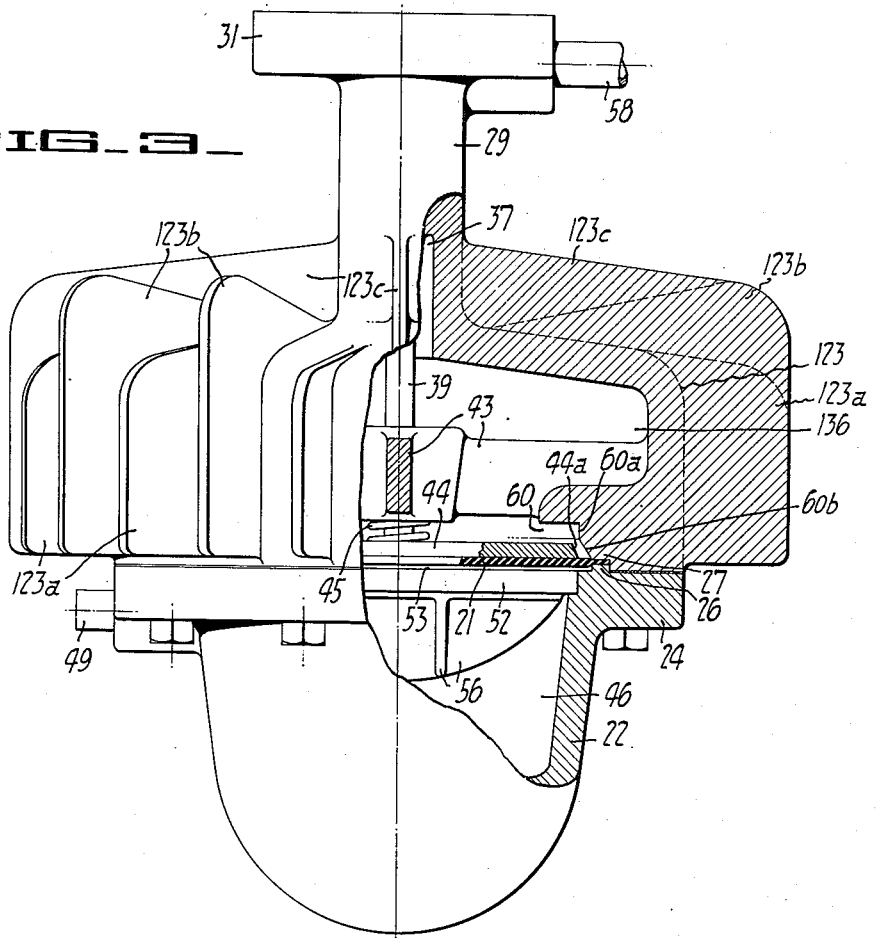
FIG_3_
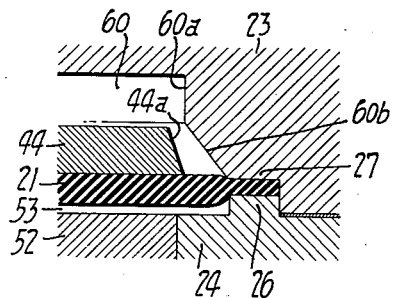
FIG_4_
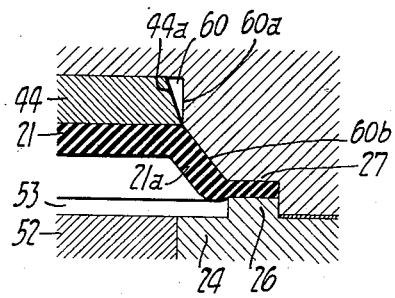
FIG_5_
INVENTOR.
Marvin H. Grove
BY
ATTORNEY Patented Dec. 2, 1941

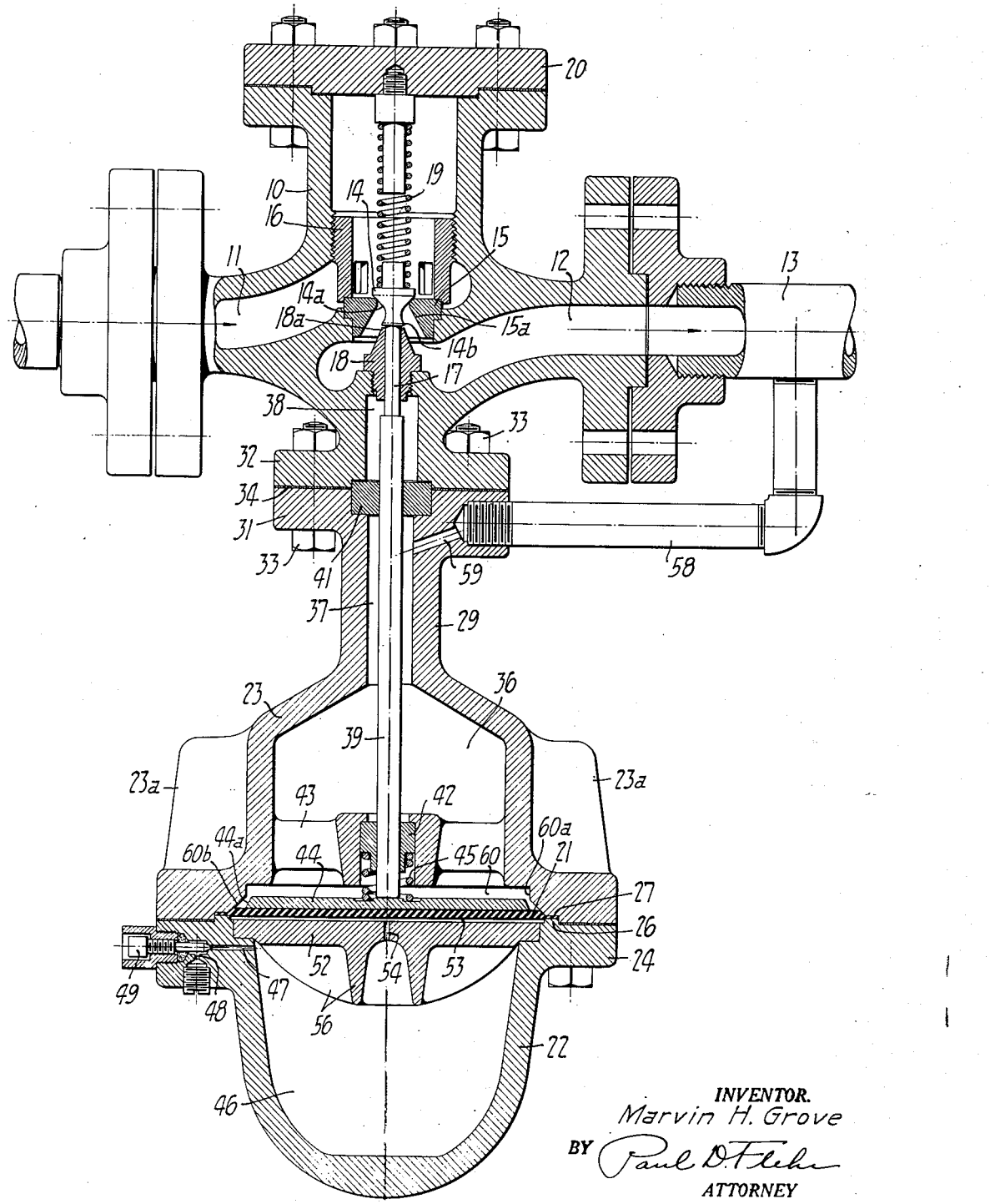

2,264,306

UNITED STATES PATENT OFFICE 2,264,306

FLUID FLOW CONTROLLER

Marvin H. Grove, Berkeley, Calif.

Application October 10, 1938, Serial No. 234,091

4 Claims. (Cl. 50—22)

This invention relates generally to devices for automatically controlling or regulating the flow of condensible elastic fluids. In the embodiment disclosed herein the invention is applied to the regulation of steam flow, whereby steam from a source of supply which may vary in pressure is delivered to a lower pressure system in which it is desired to maintain a substantially constant steam pressure, irrespective of variations in the rate of steam consumption or in the inflow pressure.

In the past automatic steam pressure reducing regulators have made use of pressure operated members such as pistons, loaded by springs or weights to automatically control the positioning of a main flow regulating valve. In general such regulators have been sluggish and unreliable in operation due to various causes, including the weight and friction of the moving parts, and to mechanical complications. For the larger capacities the prior art has frequently resorted to complicated motor equipped devices actuated by an automatically controlled hydraulic or other auxiliary source of power. Such motor equipped regulators are even more sluggish than simpler forms using fluid operated pistons, aside from the cost of manufacture and expense of maintenance.

It is an object of the present invention to provide a practical device of the above character which will have utmost mechanical simplicity and a high degree of sensitivity and accuracy, and which will require a minimum amount of servicing when in use.

Further objects of the invention will appear from the following description in which the preferred embodiment of the invention has been set forth in detail in conjunction with the accompanying drawings.

Fig. 1 of the drawings is a side elevational view, in cross section, illustrating a regulator incorporating the present invention.

Fig. 2 is a side elevational view of the regulator shown in Fig. 1, with a cooling jacket applied about the loading dome.

Fig. 3 is a side elevational view of the lower part of the regulator, showing a modified type of casing construction.

Figs. 4 and 5 are cross-sectional details showing the arrangement of parts in the proximity of the diaphragm.

In general my regulator makes use of a valve body having inflow and outflow passages and equipped with a simple type of flow controlled valve member. The valve member is actuated by a flexible diaphragm, the mounting of which is isolated from the valve body by an inter-connecting casing. A chamber on one side of the diaphragm is in communication with the outflow side of the regulator and this chamber together with a part of the inter-connecting casing is maintained filled with steam condensate during normal operation of the device. A chamber on the other side of the diaphragm contains trapped gas under pressure and serves to load or bias the diaphragm in place of a loading spring or weight. The arrangement is such that liquid or condensate is maintained over the diaphragm at all times.

Referring to the drawings, the valve body 10 is provided with inflow and outflow openings 11 and 12, which connect respectively to a source of steam under pressure, and to lower pressure piping 13 leading to a prime mover or other points of consumption. Within the body 10 there is a main valve 14 cooperating with a seat ring 15. This ring is retained in position by the removable ported sleeve 16. Valve member 14 is shown provided with a depending stem 17, guided within the fixed bushing 18, whereby the valve member may move between open and closed position relative to seat 15 with a minimum amount of friction. To prevent accidental dislodgment of the valve member 14, particularly when no pressure is being applied to the inflow side 11, a relatively light spring is provided which tends to urge the valve member towards its seat. Thus in this instance the valve 14 is engaged by the lower end of a compression spring 19, the upper end of which is seated upon the removable closure plate 20.

The under side of the valve member 14 is preferably conical shaped as indicated at 14a, and below this conical portion there is an annular shoulder 14b, forming a flow deflecting surface. The upper end 18a of the guide bushing 18 is preferably tapered to reduced diameter, as illustrated, whereby its upper end is contoured to a diameter which is not larger than the diameter of the shoulder 14b. Also the passage through the valve seat is tapered as indicated by numeral 15a. This contouring of the valve member and of the upper end of the bushing 18 is for the purpose of carrying steam flow through the seat ring 15 without causing serious cutting of the seat, and without causing a direct jetting of steam through the clearance between stem 17 and bushing 18.

Disposed below the body 10 there is diaphragm 21 made of some suitable flexible material, such as a synthetic rubber like "Duprene" or "Corprene." The mounting for diaphragm 21 includes in this instance a dome 22 and an overlying casing part 23. Dome 22 is provided with a flange 24 for clamping upon the peripheral edge portion of casing part 23. Annular shoulders 26 and 27 are provided for clamping upon a peripheral edge portion of diaphragm 21, thus forming a fluid-tight or sealed engagement.

Casing part 23 is attached to an extension or casing part 29, the upper end of which is connected to the valve body 10. Casing part 29 is of greatly reduced cross-sectional area compared to casing part 23. In this instance the connection to the valve body is detachable, and the parts used to establish the connection includes the flanges 31 and 32 formed respectively upon the upper end of casing part 29 and upon the lower side of the valve body, and which are retained together by the clamping bolts 33. This parting or division between the body and the casing serves to materially impede downward flow of heat. A suitable gasket 34 is inserted between the flanges 31 and 32, in order to seal the connection between these parts, and in order to further impede conductive flow of heat.

The casing part 23 forms a chamber 36 overlying the diaphragm 21, and this chamber connects with a passage 37 in the casing part 29, which is in alignment with the center of the diaphragm 21 and the axis of the stem 17. The chamber 36 has a relatively large volumetric capacity which is many times the volumetric displacement of diaphragm 21, which this diaphragm flexes between its upper and lower limiting positions. Passage 37 is also in alignment with the passage 38 formed in the lower part of the valve body, and into which the lower end of the stem 17 projects. Extending through the passages 37 and 38 there is thrust rod 39, which serves to transmit motion from the diaphragm 21 to the valve stem 17. The upper end of rod 39 is shown being guided by bushing 41, while the lower portion is guided by bushing 42, the latter being carried by the radial arms or webs 43. The upper end of rod 39 has abutting engagement with the lower end of stem 17, while the lower end of rod 39 engages the center of a circularly contoured thrust plate 44, which is relatively rigid and which in turn engages the adjacent face of diaphragm 21. The thrust plate is urged into engagement with the diaphragm and is maintained aligned with respect to the assembly by the light compression spring 45.

The dome 22 forms a closed gas chamber 46, adapted to contain a predetermined amount of substantially non-condensible gas under pressure, such as air. It is the pressure of gas within this chamber 46 which forms the loading bias for the regulator, and which determines the pressure maintained upon the outflow side of the regulator. In order to facilitate a variation of the pressure in chamber 46, to adjust the regulator to different outflow pressures, connecting ducts 47 and 48 are provided together with a needle valve 49. By opening needle valve 49 a part of the gas in chamber 46 can be vented to the atmosphere until a desired pressure is obtained. By introducing gas such as air through ducts 47 and 48, while needle valve 49 is open, the pressure within chamber 46 can be increased to a value desired after which needle valve 49 is again closed. By non-condensible gas, I have reference to gas such as air which will not condense at normal atmospheric temperatures or at the temperature of operation of dome 22.

In operating my regulator upon steam a column of water or condensate must be maintained at all times above the diaphragm 21, in order to prevent destruction of this diaphragm by direct contact with live steam, and in order that the temperature of trapped gas in the dome 22 does not vary over too wide a latitude. With respect to the temperature of trapped gas in dome 22, it can be briefly pointed out that a change in temperature of this gas necessarily causes a change in loading pressure, with a corresponding change in the mean regulated pressure upon the outflow side.

One feature of my invention which contributes to maintenance of a column of water or condensate above the diaphragm 21 is the manner in which this diaphragm is controlled. Thus a rigid baffle wall 52 is provided (see Grove Patent No. 2,047,101) and this wall extends across the lower side of the diaphragm 21, with its peripheral edge portion securely mounted upon the dome 22. When the parts are in the operating position illustrated in Fig. 1, that is, with the diaphragm in a position corresponding to closed position of the valve member 14, the clearance 53 afforded by the space between diaphragm 21 and the adjacent wall 52 should be relatively small. This space 53 is in restricted communication with chamber 46 through the small orifice 54. In order to reinforce wall 52 a plurality of webs 56 are shown formed upon its lower face. As will be presently explained baffle wall 52 prevents abrupt movements of diaphragm 21, and in general prevents such movements as have been found conducive to pumping out of the water column above the diaphragm 21.

Assuming that the device is to be used for maintaining a constant pressure upon the outflow side, the chamber 36 is subjected to the outflow pressure. Thus a pipe 58 is shown for this purpose with one end of this pipe connecting to the outlet piping 13, and the other end being attached to the upper end of the casing part 29. Duct 59 establishes communication between pipe 58, and the upper end of passage 37.

The body 10 of the regulator may be enveloped in suitable heat insulating material, as is common practice in the art. However the lower casing and the dome 22 should be uninsulated, to facilitate the dissipation of heat. Dissipation of heat from the casing part 23 can be augmented by means of radiating fins 23a.

Operation of the regulator described above is as follows: Assume that the inflow side 11 is connected to a suitable source of steam under pressure, while the outflow side 12 is connected to piping from which steam is being consumed at a variable rate, and in which it is desired to maintain a substantially constant pressure at all times lower than the inflow pressure. The valve body assumes a mean temperature dependent upon the temperature or temperatures of the steam being handled. The casing parts 23 and 29, and also the dome 22, assume temperatures substantially lower than that of the valve body, due to the dissipation of heat from these parts, the temperature drop between flanges 32 and 31, and the impedance to heat flow down through the relatively small cross section at area of casing part 29. As a result chamber 36 always contains a sufficient amount of water to adequately blanket over the diaphragm 21, and according to my observation, the level of this water normally extends up within passage 37, probably to a level in the neighborhood of duct 59. The gas in dome 22 assumes a temperature corresponding generally to the temperature of diaphragm 21 and dome 22, and as previously pointed out the pressure of this gas determines the outflow pressure. Given an increased demand upon the outflow side, the outflow pressure tends to drop, and this drop in pressure is immediately transmitted through pipe 58 to the passage 37 and chamber 36. The net result is that the pressure of the water overlying the diaphragm 21 is correspondingly lowered whereby the pressure in chamber 46 forces diaphragm 21 outwardly to move valve member 14 towards open position. Conversely an increase in pressure upon the outflow side, due for example to a decrease in the demand, is immediately transmitted to the upper side of diaphragm 21, whereby this diaphragm is flexed downwardly to move valve 14 downwardly a corresponding increment. Thus a substantially constant pressure is maintained on the outflow side irrespective of variations in steam consumption or variations in inflow pressure.

It has been found that without the controlling action of the baffle wall 52, and when operating upon steam pressures of say 500 lbs. per square inch upon the inlet side, the diaphragm 21 tends to partake of a cyclic movement, which has a pumping or churning action upon the water column in chamber 36 and passage 37. Such a pumping or churning action is detrimental because it is accompanied by a serious increase in operating temperature for the lower part of the structure, such as will afford an impractical short life for the diaphragm. Not only does such a churning action make for destruction of the diaphragm, but in addition causes the gas in dome 22 to reach an excessive temperature, thus causing an excessive increase in outflow temperature. With the controlling action of the baffle wall 52, such cyclic pumping or churning action is avoided, an adequate water column is maintained at all times above the diaphragm 21, and the temperature of the trapped gas in dome 22 can be maintained within reasonable temperature limits. In addition the controlling effect of baffle 52 makes for accurate regulation, with elimination of undesirable chattering or slapping of the valve member 14 upon its seat, as described in my aforesaid Patent No. 2,047,101.

Another feature which contributes to the maintenance of a water leg above diaphragm 21, is the fact that the connection from the outflow side is not directly down through ports in bushings 18 and 41. With such an arrangement the force of steam discharging through seat 15 would blow down upon the upper surface of the water column, and would also tend to cause live steam to find its way into chamber 36 and in contact with the diaphragm 21. With my regulator as described the outlet pressure is transmitted to chamber 36 through pipe 58, and steam cannot blow down through this pipe because its one end connects to the outflow side at a point remote from the region below the seat ring.

As pointed out above, for normal operation of the regulator the temperature and pressure of the trapped gas in dome 22 will not vary over a wide latitude. It may be pointed out, however, that a moderate temperature increase of dome 22 will occur in response to a sustained increase in steam flow, and this result is desirable in that the consequent increase in pressure of the trapped gas serves to increase the outflow pressure, to compensate for flow resistance in the outflow piping.

Previous reference has been made to the fact that the diaphragm 21 can be formed of synthetic rubber, such as "Duprene" or "Corprene." Such a synthetic rubber diaphragm can have extreme flexibility and sensitivity, and is capable of withstanding the temperatures to which it is subjected provided it is not brought into direct contact with live steam. In actual practice a diaphragm formed largely of "Dupreme" has been operated over long periods at temperatures well above 212° F., without appreciable disintegration.

Figs. 4 and 5 illustrate an advantageous structural feature which serves to protect the diaphragm against injury without interfering with free flexing movements. Thus the peripheral edge 44a of diaphragm plate 44 is bevelled as illustrated, and the margin of this plate may seat within an annular recess 60 formed in the casing part 23. The wall 60a defining the periphery of recess 60 is cylindrical and to a diameter only slightly greater than the greatest diameter of disc 44. A bevelled surface 60b connects surfaces 60a and shoulder 27. In practice the bevel on the periphery of plate 44 can be of the order of 15 degrees, and for a diaphragm of the order of 7 inches in diameter, the greatest diameter of plate 44 can be about five thousandths of an inch less than the diameter of surface 60a. Bevel 60b can be of the order of 50 degrees. Fig. 4 shows the diaphragm and plate 44 in positions corresponding to closed position of the valve, while the positioning in Fig. 5 with diaphragm seated in recess 60 corresponds to full open position of the valve. Note that in the limiting position of Fig. 5 the marginal edge 21a of diaphragm 21 is seated on the bevelled surface 60b and the clearance between the edge of plate 44 and surface 60a is insufficient to permit part of the diaphragm to press upwardly about the edge of the diaphragm plate. Thus there is no tendency for the diaphragm to be pinched. At the same time for positions other than the limiting position of Fig. 5 there is ample clearance about the edge of plate 44 to avoid all frictional contact with the surface 60a.

Fig. 2 illustrates a possible modification of the device in which liquid cooling means is provided for maintaining the dome 22 at a relatively low temperature. Thus in this instance the dome 22 and the other parts forming the mounting for the diaphragm, are enclosed within a container 61. This container is adapted to contain a suitable liquid such as water, and can be suspended in proper position as by means of straps 62. Assuming that without the container 61 the dome 22 would assume a temperature in excess of 212° F., with this container the temperature of the dome is maintained at the boiling point, namely, 212° F.

Fig. 3 illustrates another embodiment in which the cooling fins are made somewhat more effective for dissipating heat. Thus in this case the casing part 23, corresponding to casing part 23 of Fig. 1, is formed to a diameter substantially equal to the diameter of flange 24. The heat dissipating fins 123a, 123b, and 123c therefore tend beyond the contour of flange 24 to more effectively contact convection currents of air. Fins 123a are formed in the outer periphery of body 123. Fins 123b extend upwardly over the upper side of casing part 123 while fins 123c extend to the lower portion of casing part 29.

While the regulator described above is particularly suited for handling steam, it can be used to regulate other condensible elastic fluids. For example, it can be used to advantage to regulate the pressure of hydro-carbon vapors in petroleum distillation of cracking systems. In such instances a liquid other than the condensate of the vapor being handled can be maintained in chamber 36 in order to protect the diaphragm.

The proportions to be used in manufacturing my regulator depend somewhat upon the pressures and capacities desired. Where the pressure differential between the inflow and outflow sides is of the order of 500 lbs. or less, good results are secured by having a clearance between diaphragm 21 and wall 52 of the order of $\frac{1}{16}$", and an orifice 54 of the order of from $\frac{1}{32}$" to $\frac{1}{8}$". This will apply to regulators operating over a fair range of capacities, as for example a regulator having a valve of about 1½" in diameter. A comparatively small orifice, such as of the order of $\frac{1}{32}$" of 0.052" in diameter, gives good results for a wide range of pressure differentials, and is suitable for relatively high pressure service, or where the pressure differentials encountered may be considerably in excess of 500 lbs. With a regulator of the type illustrated operating on pressures on the order of 500 lbs. or more, the outflow pressure can be adjusted from values as low as 1 lb. per square inch, to values only slightly lower than the inflow pressure.

I claim:

1. In a steam pressure regulator, a valve body having inflow and outflow openings, a valve seat formed within the body, a valve member cooperating with the valve seat and movable in opposite directions to control flow of steam through the body, a fluid pressure operated diaphragm, a mounting for said diaphragm disposed below the valve body, said mounting forming fluid chambers above and below said diaphragm, the chamber below said diaphragm being adapted to contain gas under pressure to form a loading force upon the diaphragm and the upper chamber being adapted to contain condensate, a metal casing part extending from the mounting to the valve body, the casing part affording a passage extending from the upper chamber to the valve body, said passage being of cross-sectional area substantially small compared to the cross-sectional area of said upper chamber, said upper chamber having a volumetric capacity many times greater than the maximum volumetric displacement of the diaphragm, a stem depending from the valve member, guide means carried by the valve body and serving to accommodate the valve stem, said guide means serving to isolate the upper end of said passage from direct communication with the region underlying the valve seat, means extending upwardly through said passage forming an operative connection between the diaphragm and the valve member, means serving to establish communication between the passage and the outflow side of the regulator, said means connecting the outflow side of the regulator at a point placed at a substantial distance from the valve and its associated seat, and means disposed below said diaphragm and being cooperable with said diaphragm for minimizing pumping action of the diaphragm, whereby to avoid pumping of condensate out of the chamber above said diaphragm.

2. In a steam pressure regulator, a valve body having inflow and outflow openings, a valve seat formed within the body, a valve member cooperating with the valve seat and movable in opposite directions to control flow of steam through the body, a fluid pressure operated diaphragm, a mounting for said diaphragm disposed below the valve body, said mounting forming fluid chambers above and below said diaphragm and being adapted to dissipate heat, the chamber below said diaphragm being adapted to contain gas under pressure to form a loading force upon the diaphragm, a metal casing part extending from the mounting to the valve body, the casing part affording a passage extending from the upper chamber to the valve body, said passage being of cross-sectional area substantially small compared to the cross-sectional area of said upper chamber, said upper chamber having a volumetric capacity many times greater than the maximum volumetric displacement of the diaphragm and normally containing condensate overlying the diaphragm, a stem depending from the valve member, guide means carried by the valve body and serving to accommodate the valve stem, said guide means serving to isolate the upper end of said passage from direct communication with the region underlying the valve seat, means extending upwardly through said passage forming an operative connection between the diaphragm and the valve member, means serving to establish communication between the passage and the outflow side of the regulator, said means connecting the outflow side of the regulator at a point placed at a substantial distance from the valve and its associated seat, and means for minimizing pumping action of the diaphragm, said last means comprising a substantially rigid baffle wall extending across the lower side of the diaphragm in slightly spaced relation thereto to provide a confined space between the said wall and the lower side of the diaphragm, said space being in flow restricting communication with the remainder of the space within the gas chamber, whereby to prevent condensate from being pumped out of the chamber above the diaphragm.

3. In a steam pressure regulator, a valve body having inflow and outflow openings, a valve seat formed within the body, a valve member cooperating with the valve seat and movable in a vertical direction between open and closed positions to control flow of steam through the body, a fluid pressure operated diaphragm disposed generally in a horizontal position below the valve body, a mounting for said diaphragm likewise disposed below the valve body, said mounting forming a fluid chamber upon the upper side of the diaphragm, means affording a loading force acting upon the under side of the diaphragm and serving to urge the same upwardly, a metal casing part extending from said mounting to said valve body, the upper end of said casing part being coupled to the lower end of the valve body, said casing part affording a passage extending from said chamber to the valve body and aligned with respect to the center of the diaphragm, a stem depending from the valve member, a guide bushing carried by the valve body and serving to accommodate the valve stem, said guide bushing serving to isolate the upper end of the passage with respect to direct communication with the region underlying the valve seat, a thrust rod extending upwardly through said passage, the lower end of said rod being in operative engagement with said diaphragm and the upper end of said rod being in operative engagement with the lower end of the valve stem below said bushing, a pipe serving to establish communication between said passage and the outflow side of the regulator, said pipe having its one end connected to said passage below said bushing and having its other end connected to the outflow side of the regulator at a point remote from the region below said valve seat, said chamber and at least a part of said passage being adapted to contain a column of condensate overlying the diaphragm to protect said diaphragm from heat and contact with steam when the regulator is in normal operation, and means serving to minimize pumping action of the diaphragm, said means comprising a substantially rigid baffle wall extending across the lower side of the diaphragm and in close proximity to the same, whereby a confined fluid space is formed between the lower side of the diaphragm and the upper surface of said baffle wall, and orifice means affording restricted venting of said space.

4. In a pressure regulator for condensible elastic fluids like steam, a valve body having inflow and outflow openings, a valve seat formed within the body, a valve member cooperating with said valve seat and movable in opposite directions for controlling flow of steam through the valve body, a fluid pressure operated diaphragm below the valve body, mounting means for said diaphragm, the mounting means forming fluid chambers on opposite sides of the diaphragm and including means capable of dissipating heat conducted to the same, the lower one of said chambers being adapted to contain gas under pressure to form a loading force upon the diaphragm and the upper one of said chambers being adapted to contain condensate for protecting said diaphragm against direct contact with steam, casing means serving to connect the mounting means to the valve body and affording a passage connected to the upper one of said fluid chambers, means extending through said passage and forming an operative connection between the diaphragm and the valve member, and means disposed below said diaphragm and being cooperable with said diaphragm for minimizing pumping action of the diaphragm, whereby to prevent condensate from being pumped out of said upper chamber.

MARVIN H. GROVE.